Sept. 25, 1956   L. D. COBB   2,764,433
DEMOUNTABLE CLOSURE
Filed Dec. 31, 1952

INVENTOR:
LELAND D. COBB,
BY Edward H. Goodrich.
HIS ATTORNEY.

United States Patent Office 2,764,433
Patented Sept. 25, 1956

2,764,433
DEMOUNTABLE CLOSURE

Leland D. Cobb, Forestville, Conn., assignor to General Motors Corporation, Detroit, Mich., a corporation of Delaware Application December 31, 1952, Serial No. 329,019

5 Claims. (Cl. 286—5)

This invention relates to a demountable closure for closing the end space between a pair of relatively rotatable members and particularly to a demountable seal for retaining lubricant in an antifriction bearing and for preventing the entrance of dirt and other objectionable material into the bearing.

It has been the practice for many years to permanently close the ends of the annular lubricant chamber between the race rings of an antifriction bearing by locating across each end of the lubricant chamber a ring-shaped metal shield or seal and by expanding a folded-over peripheral rim on each shield into permanently wedged engagement with the walls of a groove in one of these race rings. This rim expansion frequently distorts the race ring causing an improper fit of the bearing in its mounting and also causing an improper fit of the bearing parts which were previously ground to within tolerances of a small fraction of a thousandth of an inch, all of which often results in much shortened bearing life. With present day high speed machinery, antifriction bearings are often subjected to unintended overloads and high operating temperatures which reduce lubricant life in the bearings and necessitates occasional cleaning of the bearings and replacement of lubricant to avoid bearing failure. These permanently installed seals are difficult to remove, and even when such seals are broken loose and removed, the seals are not only ruined but the bearings are frequently damaged to the extent that they have to be replaced. Installation of a new shield usually must be made at the factory where the bearing was manufactured. Consequently, it has been regular practice to operate antifriction bearings without attention and until failure which has often been premature due to insufficient lubrication, resulting in loss of much production time during bearing replacement.

An object of this invention is to provide an improved closure for the end of a lubricant chamber between relatively rotatable members and which may be easily mounted in and demounted from position without injury to the closure or to the members with which it is associated. A further object is to provide for the end of a bearing an improved demountable closure of simple and inexpensive construction and having a detachable reinforcing portion.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

Figure 1:
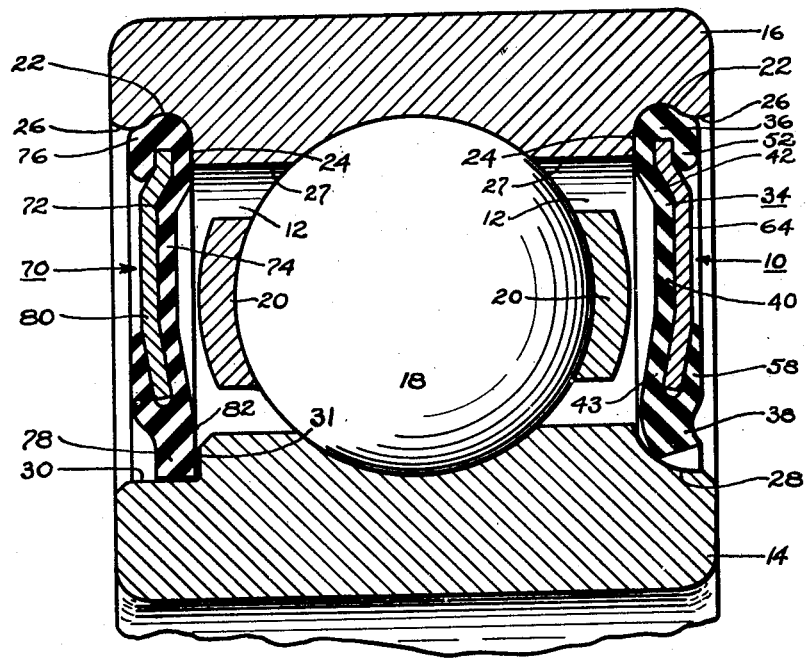
Figure 1 is a cross sectional view of a portion of an antifriction bearing showing two related forms of demountable closures.

The closure, as 10, may be frequently and repeatedly mounted and demounted without injury to itself or to the members with which it is associated, this closure being shown in demountable closing relation across the end of an annular lubricant chamber 12 between a pair of relatively rotatable inner and outer antifriction bearing race rings 14 and 16 provided with the usual raceways that cooperatively receive rolling elements, as balls 18 guided by a separator 20. At each end of one of the race rings, as the outer race ring 16, there is provided an annular groove 22 transversely curved between a substantially radially disposed annular shoulder 24 and a transversely rounded annular land 26 which has a diameter intermediate between that of the bottom of this groove and that of an inner cylindrical wall 27 of this race ring. One end of one of the race rings, as the inner race ring 14, has a transversely curved annular notch 28 and the other end of this race ring has an annular notch formed by a peripheral wall 30, herein shown cylindrical, and a generally radial annular shoulder 31.

Figure 2:
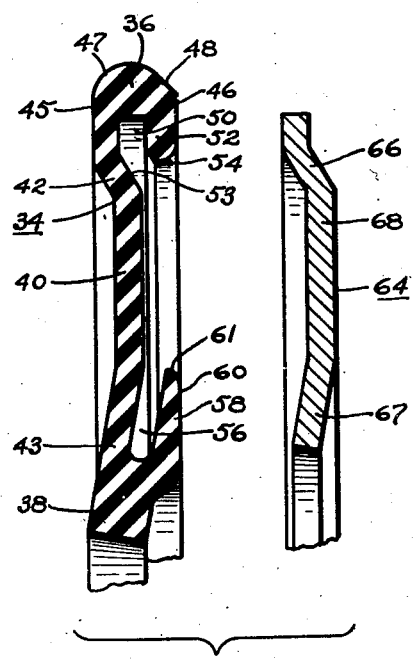
Figure 2 is a fragmentary enlarged cross sectional exploded view showing my sealing washer and its reinforcing ring.
Figure 3:
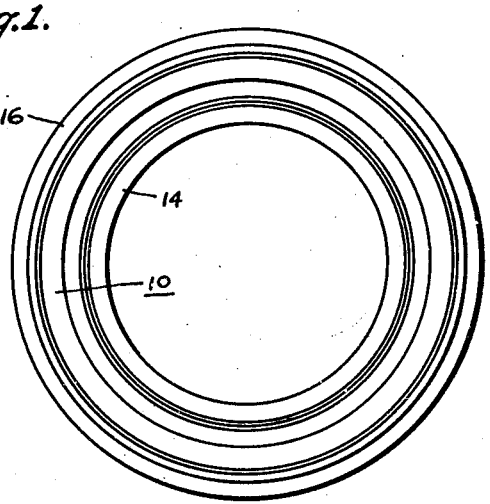
Figure 3 is an end view showing a bearing with my demountable seal installed.

In the seal at the right hand end of Figure 1 and in Figure 2, an inherently resilient sealing washer 34 has a peripherally extending deformable bead 36 and a resilient annular sealing lip 38 connected by a laterally outwardly offset resilient intermediate wall 40 which has generally conical annular portions 42 and 43 that respectively merge with the bead 36 and with the resilient lip 38. The wall 40, which is narrow in comparison to the width of the bead 36, is laterally offset to provide ample clearance relation with the separator 20 and to provide for additional lubricant space in the chamber 12. As best illustrated in Figure 1, the central bore through the sealing washer 34 is generally conical and slightly larger in diameter than that of the bottom of the sealing notch 28 so that the inner portion of the sealing lip 38 is resiliently deformed into lightly wiping sealing contact with the curved side wall of the notch. With this sealing engagement, the lip 38 will not bottom in the notch 28 and an effective seal is maintained even in the event of misalignment of race rings.

The resiliently deformable bead 36 has generally flat faced inner and outer annular walls 45 and 46 and a transversely convexed peripheral bead portion 47 merges with the inner wall 45 and with a frusto-conical annular portion 48 terminating at the wall 46. The width of this bead 36 exceeds the width of the groove 22 and the diameter of this yieldable bead slightly exceeds that of the groove 22 thereby providing a bead which may be deformably snapped past the annular land 26 into and out of resiliently tight interfitting sealingly seated engagement against the shoulder 24 and against the groove walls, thus serving to locate the closure 10 axially and radially in a predetermined position. The conical annular portion 48 deformably engages the rounded land 26 and extends outward beyond the groove 22 to a position where a screw driver or other suitable tool can be easily inserted between the outer portion of the bead 36 and the land 26 to pry the closure 10 from the bearing. Due to the inherent resiliency of the member 34, the bead 36 may be easily snapped past the land 26 into and out of mounted position without damage to either the closure or to the bearing.

A radially inwardly opening annular groove 50 formed in the bead 36 between a radially inwardly directed lip 52 and the inner wall 45, has spaced side walls generally parallel to the wall 45 and a conical wall 53 formed by the annular portion 42 and located opposite to a transversely rounded rim 54 on the lip 52. An inner annular groove 56 in the resilient sealing washer 34 and opening generally radially inwardly has uniformly spaced conical side walls between an annular lip 58 and the conical portion 43, the bottom of this groove 56 terminating within or adjacent to the sealing lip 38. The lip 58, which may extend laterally outwardly with respect to the sealing lip 38, preferably has its outer wall 60 in a common plane with the outer bead wall 46 and terminates in a transversely rounded rim 61. The sealing washer 34 may be composed of various rubber-like materials such as a synthetic rubber that may be easily formed in a mould and vulcanized to the desired resiliency. This rubber-like material should not be deleteriously affected by bearing lubricants and should not deteriorate or change its resiliency in the presence of heat and light. One satisfactory rubber-like material for my sealing washer 34 comprises a resilient vulcanized synthetic rubber embodying a polymerization product of butadiene and acrylic nitrile and/or a copolymer of butadiene and styrene.

A dished reinforcing disc 64, which may be stamped out to shape from resilient sheet metal or formed from plastic or suitable sheet material, has angularly disposed outer and inner rim portions 66 and 67 and an intermediate flat portion 68. The rim portions 66 and 67 respectively conform with and demountably fit in the annular sealing washer grooves 50 and 56 and the intermediate flat portion 68 fits against and conforms with the intermediate wall 40. My rubber-like sealing washer 34 may be easily and inexpensively produced in a simple moulding and vulcanizing operation after which, due to its inherent resiliency, it may be easily stretched over and into interfitting relation with the separately formed reinforcing disc 64. The reinforcing disc which snugly fits within the grooves 50 and 56 laterally urges the resilient sealing lip 38 into sealing position, and since this disc 64 is demountable in the washer 34, reinforcing discs of different thicknesses and of different resiliencies may be interchangeably inserted to provide the desired lateral stiffness to the washer 34 together with the required yieldable sealing engagement of the sealing lip 38 against the laterally curved wall of the notch 28. Also, the disc rim 66 preferably bottoms in the washer groove 50 to compressively urge the periphery of the bead 36 into firmly resilient sealing engagement with the bottom of the groove 22.

In the embodiment at the left hand end of Figure 1, a closure, generally indicated at 70 has a moulded washer member 72 composed of a suitable synthetic resilient rubber and provided with an intermediate wall 74 extending between and integral with a peripheral bead 76 and a closure lip 78 and a conforming dish-shaped reinforcing disc 80 is demountably received in annular grooves in the bead 76 and in the lip 78, all in general accordance with the construction of the closure 10. The resilient bead 76 may be demountably snapped past the land 26 into and out of firmly seated sealing relation in the left hand groove 22 in the same manner as described with respect to the sealing member 10. The closure lip 78 has a flat inner wall 82 in closely spaced relation to the annular shoulder 31 and the central bore through this lip 78 receives the peripheral wall 30 in closely spaced relation.

I claim:

1. In a closure for demountable positioning across an annular lubricant chamber between a pair of relatively rotatable members one of which has a groove opening towards the other member, said other member having an annular seal engaging wall, an annular resilient sealing washer peripherally and demountably seated within said groove in sealing engagement with the walls of the groove, a resilient annular lip on the seal in lightly wiping sealing engagement with the seal engaging wall, a laterally resilient reinforcing disc in unit-handling relation with the washer and laterally urging the washer lip into sealing engagement, and spaced grooved portions on the sealing washer receiving the disc and demountably and resiliently gripping the reinforcing disc respectively at its inner and outer rim portions.

2. In a closure for demountable positioning across an annular lubricant chamber between a pair of relatively rotatable members one of which has a sealing washer receiving groove opening generally radially towards the other member, an inherently resilient sealing washer having an annular peripheral bead demountably and sealingly seated in said groove, an annular lip on the washer deformed into lightly wiping sealing engagement with said other member, the bead and the lip being respectively provided with annular grooves opening generally radially towards each other, a reinforcing disc in unit-handling relation with the sealing washer, and the inner and outer disc peripheries being demountably gripped by the sealing washer bead and lip within the sealing washer grooves.

3. In a closure for demountable positioning across an annular lubricant chamber between a pair of relatively rotatable members one of which has a groove opening towards the other member, an annular resilient laterally dished sealing washer extending across the lubricant chamber, an annular peripherally extending bead on the washer demountably and deformably seated within the groove in sealing engagement with the walls of the groove, an annular lip in lightly wiping sealing contact against said other relatively rotatable member, an intermediate washer wall connecting the lip and the bead, the intermediate washer wall being laterally offset from the rear face of the bead and being narrower than said bead, a springy dished reinforcing disc laterally interfitting with the sealing washer, and annular grooved portions in the lip and in said bead demountably gripping the reinforcing disc at its inner and outer rims, the sealing washer and reinforcing disc being mountable in and demountable from sealing position as a unit handling assembly.

4. In a closure for demountable positioning across an annular lubricant chamber between a pair of relatively rotatable members one of which has an annular mounting groove provided with a substantially radial inner wall, the other member having an annular notch, said groove and notch opening generally radially towards each other, an inherently resilient sealing washer extending radially across the lubricant chamber, a peripheral sealing washer bead demountably fitting in the groove and having a transversely curved outer face bottoming in said groove and having a substantially radial inner wall seated in sealing engagement against the inner wall of said groove, an annular lip on the washer in lightly wiping resilient sealing engagement with a wall of the annular notch, a reinforcing disc laterally engaging the sealing washer and extending the major portion of the distance across the lubricant chamber, and annularly groved sealing washer portions resiliently and demountably gripping the inner and outer peripheries of the reinforcing disc.

5. In a closure for demountable positioning across an annular lubricant chamber between a pair of relatively rotatable members one of which has an annular groove opening towards the other member, said groove having a transversely curved wall extending between an annular land and an annular shoulder, a laterally dished resilient sealing washer extending across the lubricant chamber, an annular sealing washer lip in lightly wiping sealing engagement with said other member, a peripheral sealing washer bead demountably received in said groove, the bead having a transversely curved peripheral wall and a conical face which deformably and sealingly engages said land, a radial bead face engageable with the annular shoulder, the bead and the sealing washer lip having annular grooves opening towards each other, and a reinforcing disc laterally interfitting with a side of the dished sealing washer, the inner and outer disc peripheries being demountably held by the sealing washer grooves, and the resilient bead being compressed between the disc periphery and said first mentioned member and sealingly seating against the groove walls on said member.

References Cited in the file of this patent

UNITED STATES PATENTS

| | | |
|---|---|---|
| 2,173,247 | Bott | Sept. 19, 1939 |
| 2,237,616 | Smith | Apr. 8, 1941 |
| 2,281,010 | Reynolds et al. | Apr. 28, 1942 |
| 2,294,105 | Wallgren | Aug. 25, 1942 |
| 2,467,049 | Peterson | Apr. 12, 1949 |